Dec. 4, 1956     H. GELB     2,772,485
REGISTERING GAGE

Filed Dec. 14, 1954     3 Sheets-Sheet 1

INVENTOR.
Herbert Gelb
BY
*Hilliard E. Rackenbach*
ATTORNEY

Dec. 4, 1956   H. GELB   2,772,485
REGISTERING GAGE
Filed Dec. 14, 1954   3 Sheets-Sheet 2
FIG. 3
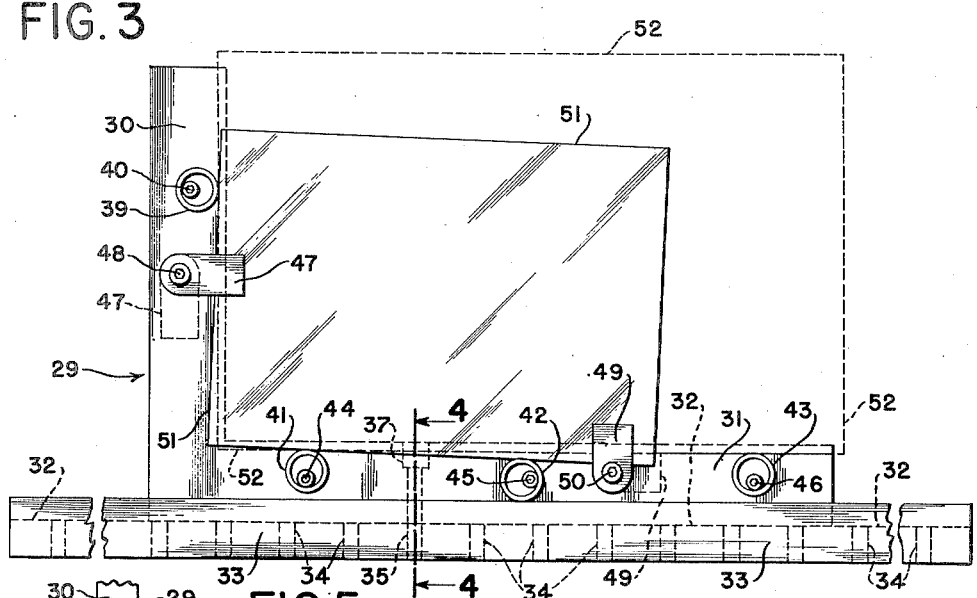
FIG. 4
FIG. 5
FIG. 6
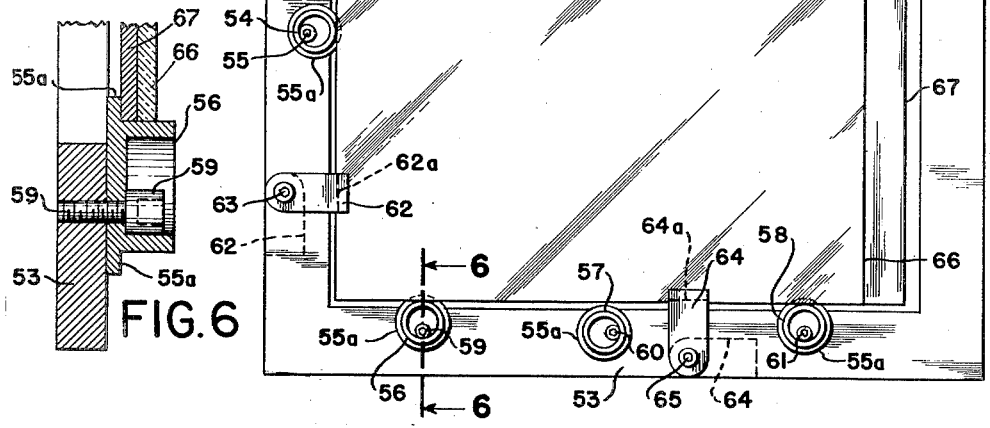
INVENTOR.
Herbert Gelb
BY
ATTORNEY Dec. 4, 1956     H. GELB     2,772,485
REGISTERING GAGE Filed Dec. 14, 1954     3 Sheets-Sheet 3

INVENTOR.
Herbert Gelb
BY
ATTORNEY

United States Patent Office 2,772,485
Patented Dec. 4, 1956

2,772,485

REGISTERING GAGE

Herbert Gelb, New York, N. Y., assignor to
Joseph Gelb Company, Newark, N. J.

Application December 14, 1954, Serial No. 475,124

1 Claim. (Cl. 33—184.5)

This invention relates generally to gages for predetermining the orientation of a rigid sheet of material within its own plane, and for predetermining registration of two or more superimposed rigid sheets of material, such as photographic and other transparencies, contact photoprints made therethrough, and masks made therefor. The invention is primarily related to the graphic arts, and particularly to color separation work and masking in photography used in connection with plate making by photoengraving.

The general object of the invention is to provide a novel, simple, adjustable, durable, and extremely accurate gage useful for the purposes described above, and a method for making a plurality of gages all of which are perfectly interchangeable.

A gage constructed according to the present invention may be utilized as a holder of a rigid sheet of sensitized material within a camera, as a holder of a transparency or other subject to be photographed, and as a holder for a transparency and sensitized material to be contact-photoprinted through said transparency, as in a printing frame. Since the invention provides a method for making a plurality of perfectly interchangeable gages, the individual gages of a set may remain fixed with relationship to their respective apparatuses employed in photography.

The utility of the invention is best understood from a discussion of certain functions common in the graphic arts. The following matter touches briefly upon these functions.

Production by hand of a simple mask for certain portions of a subject to be photographed may serve as a first example. Let it be assumed that the subject itself is a photograph on a rectangular sheet of glass one corner of which is designated $a$. A mask for certain portions of the subject may be made by superimposing another rectangular sheet of glass thereon and blacking out, by brush, pen, or other instrument, those certain portions. It will be obvious that, while the mask is being made, the superimposed sheet cannot be permitted to slide relatively to the subject and so destroy register; accordingly, various devices are resorted to for preventing any relative movement between the two sheets during the making of the mask and, also, subsequently when the masked subject is photographed. For convenience that corner of the superimposed sheet corresponding to corner $a$ of the subject sheet may be designated $a'$. Under certain conditions it may be necessary to separate the subject and its mask prior to photography and later to reregister the two sheets. Reregistering by trial and error is extremely difficult and time-consuming; but it is often necessary in many establishments dealing in the graphic arts. Obviously if both the subject sheet and the superimposed mask sheet were originally placed together in a gage, with, say, the corresponding corners $a$ and $a'$ in register, reregistering of the two sheets could thereafter be readily attained by repositioning the sheets in the same manner in the same gage. Gages for the work described above are, of course, known. Such gages are, essentially, frames having a fixed detent with its detaining surface registered with a first axis, and at least, and, usually, only, two other fixed detents with their detaining surfaces registered with a second axis meeting the first at an angle, usually 90°. The sheets are positioned on the gage so that one of two adjacent edges of each sheet contacts the first named detent and the other of the two adjacent edges of each sheet contacts the second named detents. Barring abrasion of the edges of the sheets and of the detaining surfaces of the detents, two sheets once registered on the gage may be perfectly reregistered an indefinite number of times.

Such gages heretofore known have employed fixed detents; and it will be seen at once that duplication of a particular gage, by machining, is next to impossible. A single gage having detents with hardened detaining surfaces may be relied upon for precise reregistering throughout a considerable period of time; but eventually wear of one or more of the detaining surfaces will render it impossible to attain perfect reregister of two particular sheets. And, too, compensating for wear of the detaining surfaces by machining is equally as difficult as duplicating a particular gage by the same process.

Thus it is a particular object of the present invention to provide a gage having at least two adjustable detents whereby the gage may be duplicated and also whereby wear of the detaining surfaces may be compensated for.

Where a gage is provided as part of an illuminator frame on which a transparency and a superimposed mask sheet may be mounted for blacking out certain portions of the transparency, such gage is ordinarily fixed, and may not be moved, for example, to a printing frame for holding the transparency and its mask together with a sheet of sensitized material desired to be contact-printed through the transparency and mask. As it is practically impossible to duplicate a gage having fixed detents, any gage provided at a printing frame may reasonably be expected to be incapable of predetermining precise reregister of the transparency and its mask if the two have been separated since the making of the mask and have not been reregistered on the original gage and clamped together in some manner. The great convenience of having a duplicate gage at a printing frame, or within a camera, is self-evident. The gage of the present invention may be duplicated with such extreme accuracy that two or more sheets, once sandwiched together in register on a first gage and then separated, may be brought back into perfect register on any of a plurality of duplicates of the first gage. For example, the first gage may be a fixed part of the illuminator frame used for making a mask or filter; one of its duplicates may form part of a printing frame to which the separate sheets, together with a sensitized sheet, may be carried and perfectly reregistered; and, also, another of its duplicates may form part of a plate holder within a camera whereby an exposed plate may subsequently be precisely reregistered with a subject if the latter were also held by still another duplicate of the gage.

Ideally, of course, all photographic apparatuses constituting the equipment on which, from time to time in a photoengraving process, a transparency, its mask, its filter, and its print may be mounted should be provided with duplicate gages; and if such provision is made the usually difficult problem of attaining perfect register is solved. Perfection of register contemplated by the present gage and any of its duplicates is such that, for example, a negative and a positive made therefrom, each being on a transparent base, such as glass, may be sandwiched together and placed on any gage of a set to effect a complete opacity. When it is realized that the eye can detect a line of light considerably less than one thousandth of an inch in breadth, the difficulty of machining a duplicate of a gage having fixed detents so that the duplicate may support the negative and positive together exactly in the same relationship that would obtain on the original gage is manifest.

A particular feature of the present invention is that extreme accuracy in the fabrication of the several gages constituting a set of duplicates is not necessary: extreme accuracy is required only in the adjustment of at least two of the detents. While it is desirable that the adjustable detents of the gages constituting a set be as nearly alike as may be easily possible with machining of good quality, it is not essential that such detents be exactly alike, for it will be shown herein that, by adjustment, physical differences between the adjustable detents may be adequately compensated for.

The method provided herein for making a set of interchangeable gages is the most important advantage of the invention. Where perfect register and reregister may be had with positive and negative transparencies, masks, filters, and plates on any one of the gages of a set, all functions having to do with register in color separation work, masking out, filtering to change color density, multiple exposure of sensitized material, and photoprinting of sensitized plates are greatly simplified.

It will be apparent from the specification that the invention is not limited to the graphic arts, and that it may be applied otherwise.

These and other objects, features, and advantages of the invention will be more fully understood from the following description and from the drawing, in which several embodiments of the invention are illustrated.

In the drawing:

Fig. 3 shows a second embodiment; and Fig. 4 is the section 4—4 of Fig. 3.

Fig. 5 shows a third embodiment; and Fig. 6 is the section 6—6 of Fig. 5.

Figure 7:
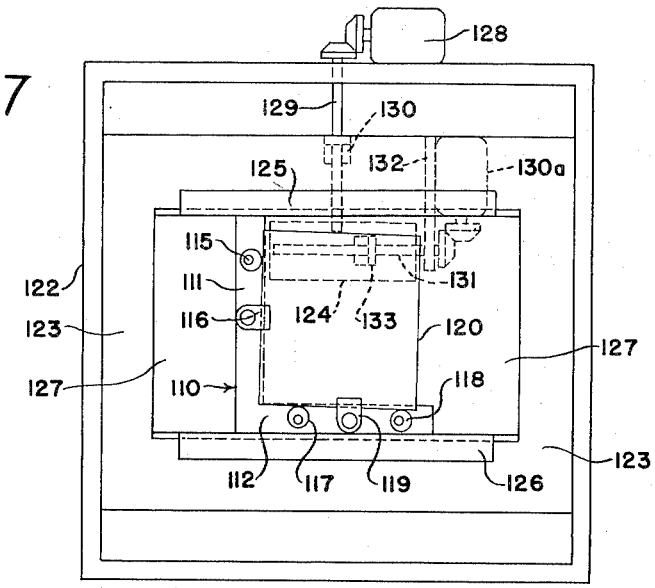
Figure 8:
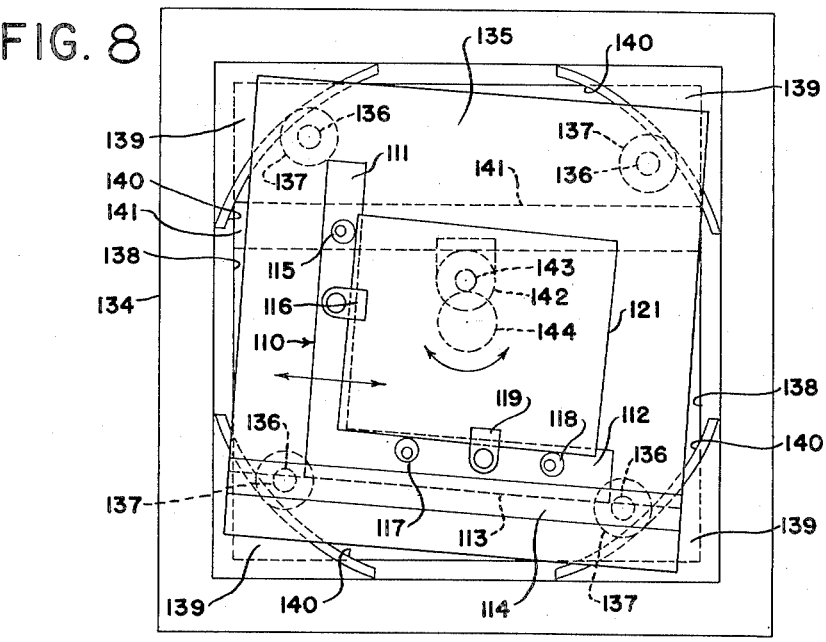

Figs. 7 and 8 each show a fourth embodiment in combination with means for supporting the same.

Fig. 7 illustrates this lastnamed embodiment mounted on a supporting structure adapted to move the gage, as an entity, and within its own plane, along either of two axes disposed at 90° to each other, e. g., horizontal and vertical axes.

Fig. 8 illustrates the same embodiment mounted on a supporting structure adapted to rotate the gage, as an entity, within its own plane.

The gage of the present invention, without respect to the particular form of embodiment thereof, is essentially a frame having at least three detents, two of which are adjustable and lockable, with one of the detents adapted to be engaged by one of two adjacent edges of a rigid sheet of material and with the other detents adapted to be engaged by the other of two adjacent edges of the sheet. The invention is not limited to any particular form of frame illustrated herein or to any particular form of detent shown in the drawing. It will be clear that any of a great variety of frames and detents may be employed within the scope of the invention. A primary function of the frame is to provide a rigid mount for the detents so that the latter have a fixed normal relationship to each other, whereby a relatively minute change of relationship of the detents with respect to each other may be had by adjustment without disturbing the normal distribution of the detents on the frame. The detents may be of any suitable construction; the essential function of each detent is to provide a detaining surface against which an edge of a rigid sheet of material may be applied, the position of the detaining surface of a particular detent with reference to such surfaces of other detents pre- determining the orientation of the sheet when the latter is mounted on the gage.

Figure 1:
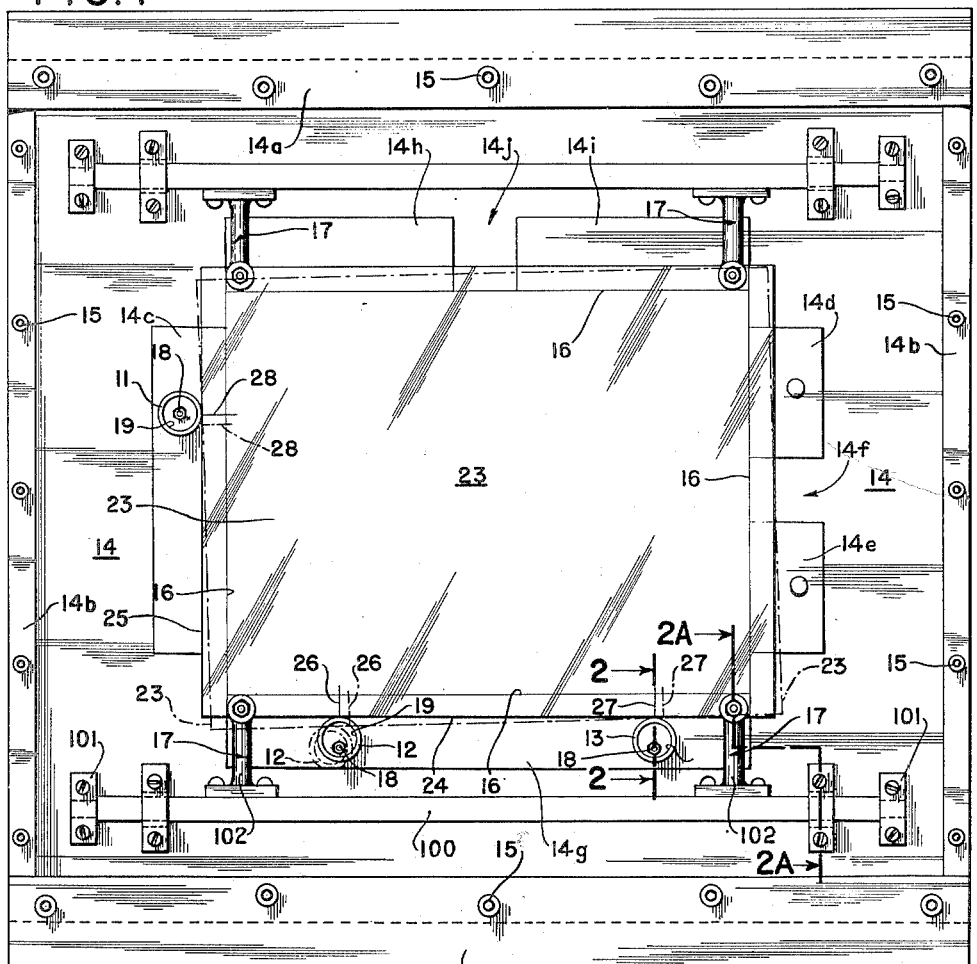
Fig. 1 shows a first embodiment.

In the embodiment illustrated in Fig. 1 the frame, in its entirety, is designated 10, and the detents, of which there are three, are designated 11, 12, and 13.

The frame shown in Fig. 1 is of composite construction, and is, essentially, a relatively thin but rigid structure of rectangular outline and having a central rectangular fenestration the edges of which are parallel to corresponding peripheral edges of the structure.

The frame 10 comprises a rectangular plate 14 marginally reinforced by strips 14a and strips 14b (respectively top and bottom and left and right, Fig. 1), the strips being secured to the plate by means of screws 15. Plate 14 is provided with a rectangular fenestration 16, which may be centrally disposed, as shown. Relieved portions, or islands, of plate 14 surround the fenestration 16. The islands are of uniform height, and may be of rectangular outline, as shown. On the left of the fenestration, in Fig. 1, is an island 14c; and detent 11 is mounted on this island. On the right of the fenestration are two islands 14d and 14e, separated by a valley 14f (see below). Beneath the fenestration, in Fig. 1, is an island 14g; and detents 12 and 13 are mounted on this island. Above the fenestration are two islands 14h and 14i, separated by a valley 14j (see below).

Mounted on plate 14 above and beneath the fenestration are clamps 17 adapted to hold one or more sheets of material flatwise against the islands.

The detents 11, 12, and 13 are right cylinders, preferably, but not necessarily, of equal size. The detaining surface of each detent is its cylindrical surface. The diameter and height of the detents are not critical; however, the fineness of adjustability of the gage increases with the diameter of the detents, and, of course, the height must be as great as the aggregate thickness of sheets to be applied to the gage at one time.

Figure 2:
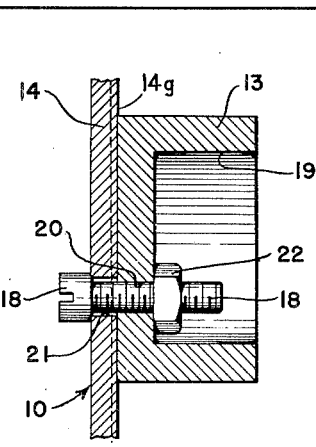
Figs. 2 and 2A are respectively the sections 2—2 and 2A—2A of Fig. 1.

In the construction shown each detent is secured to the frame by means of a screw 18, the head of which is on the rear side of the gage. Each detent is a solid right cylinder having a coaxial counterbore 19 which extends from the top of the cylinder toward its base. Each screw 18 engages the threads (not shown) of a tapped bore 20 provided in the base of the cylinder, and passes freely through a corresponding clear bore 21 provided in plate 14. The counterbore 19 is a convenience only, and is provided to accommodate a jam nut 22 (see Fig. 2, particularly also Fig. 1). The tapped bore 20 of detent 11 is coaxial with the cylinder; bores 20 of detents 12 and 13 are eccentric. When the jam nuts 22 and the screws 18 are loosened the several detents may be rotated; however, since the bore 21 of detent 11 is coaxial, rotation of this detent does not result in an effective change of the position of its cylindrical detaining surface; but rotation of detents 12 and 13, the bores 21 of which are eccentric, does result in changes of the position of their cylindrical detaining surfaces; see Fig. 1. Here detents 12 and 13 are both adjustable and lockable. It will be shown subsequently that any one of the three detents might well be selected as the nonadjustable detent, or that all detents may be adjustable.

In making detents of the cylindrical type here shown care should be taken to form truly right cylinders. It is of no consequence that slight dimensional differences between the three cylinders are present, as their relative dimensions are not critical.

As detent 11 is mounted on island 14c at one side of fenestration 16, and detents 12 and 13 are mounted on island 14g beneath the fenestration, a sheet 23 of rigid material having two adjacent edges meeting at an angle may be mounted on the gage and moved into engagement with the three detents as shown in Fig. 1. Assuming the sheet 23 to be at least as large as indicated in the drawing, the sheet may contact the tops of the islands flatwise and be held thereagainst by the clamps 17.

While screw 18 and jam nut 22 of detent 11 may be loosened so that the cylinder may be rotated, the rotation cannot be regarded as an adjustment equivalent to that available for detents 12 and 13 if detent is perfectly cylindrical and its bore 20 is perfectly coaxial.

For all practical purposes detent 11 is a fixed detent; however its rotatability provides a considerable choice of detaining surfaces to compensate for wear. Detents 12 and 13 may be adjusted to provide a variety of detaining surfaces located in different positions with respect to the gage as a whole. Of course a sheet such as 23 may be mounted on the gage so that one of two adjacent edges of the sheet engages detent 11 and the other of the two adjacent edges engages detents 12 and 13 no matter what the adjustment of the last two detents may be, for it is always possible for the two adjacent edges to contact at least three detaining surfaces arranged in the pattern illustrated in Fig. 1. In this figure the solid outline of sheet 23 indicates its orientation when mounted on the gage in contact with all three detents when the adjustment thereof indicated in solid lines obtains. The lower edge 24 of sheet 23 engages detents 12 and 13; and the lefthand edge 25 of the sheet engages detent 11. Solid lines 26 and 27 respectively are normals to the tangents formed by edge 24 with the cylindrical surfaces of detents 12 and 13; and solid line 28 is a normal to the tangent formed by edge 25 with the cylindrical surface of detent 11.

If screw 18 and nut 22 of only detent 12 are loosened and the detent is rotated to assume the position indicated in dot and dash lines in Fig. 1, and then relocked in position, the sheet 23, if free, will collapse into the position, and assume the orientation, represented by the dot and dash outline indexed 23. It will be noted that detent 12, after rotation from the position illustrated in solid lines, provides a detaining surface lower than before. Accordingly the sheet 23 has actually rotated slightly; line 28 has moved downwardly, and lines 26 and 27 both have moved to the right, as indicated. Lines 26, 27, and 28 are no longer normals to the tangents above described. However, if detent 12 is rotated back into the position shown in solid lines in Fig. 1, the original orientation of sheet 23 will again obtain.

The rotatability of detents 11, 12, and 13 is primarily for the purpose of providing a means for compensating for wear. However the rotatability of detents 12 and 13 also provides a means for varying the orientation of a sheet mounted on the gage.

The proper positioning of a sheet upon the gage requires, of course, that two adjacent edges of the sheet engage all detents. To facilitate the mounting of a sheet upon the gage the valleys 14f and 14j are provided, whereby the finger of the operator may conveniently push the sheet firmly against the detents. These valleys also are a convenience in removing a sheet, as their presence enables the operator to insert a finger nail between the sheet and plate 14.

Figure 2A:
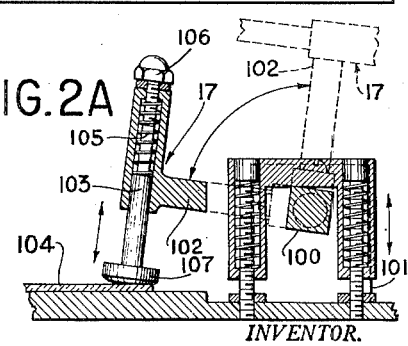

Whether the gage is used in a vertical or horizontal position means for preventing accidental or other sliding movement of the mounted sheet relative to the gage are highly desirable. Such means may take the form of clamps 17. There are, as shown in Fig. 1, two clamps 17, one above the fenestration 16, and the other beneath it, both mounted on plate 14. Both clamps are alike. The construction of a clamp 17 is illustrated in Figs. 1 and 2A, the latter being the section 2A—2A of Fig. 1, somewhat enlarged.

Another embodiment of the invention is illustrated in Figs. 3 and 4. In this embodiment the frame designated 29 in its entirety, is a rigid L, having a vertical leg 30 and a horizontal leg 31. Leg 31 is mounted for sliding horizontal movement within a keyway 32 provided in a horizontal bar 33; see Fig. 4, the section 4—4 of Fig. 3. The bar 33 is provided with a number of spaced tapped bores 34, as indicated in dotted lines in Fig. 3. The frame 29 may be secured at any one of a number of stations of position on bar 33 by means of a screw 35 which freely passes through a bore 36 provided in leg 31 and may engage the threads of any one of the tapped bores 34. The head 37 of screw 35 is shown to be received within a counterbore 38 in Fig. 4.

This embodiment has four detents, one mounted on leg 30, and the other three mounted on leg 31. All detents are represented as being adjustable and lockable. Detent 39 is mounted on leg 30 at 40; and while this detent may be adjusted, it is preferably employed as a fixed detent (see below). Detents 41, 42, and 43 are respectively mounted on leg 31 at 44, 45, and 46. The detents 39, 41, 42, and 43 are similar to detents 11, 12, and 13 in that they are solid right cylinders having coaxial counterbores. The detents 39, 41, 42, and 43 may be mounted, like detents 12 and 13, by means of a screw similar to 18, and, also like detents 12 and 13, the present detents are provided with eccentric tapped screw holes. Jam nuts, like 22, are shown in Fig. 3. The axes of the mounting screws for detents 41, 42, and 43 lie in a common plane.

A clamp 37 for holding a sheet flatwise against the frame 29 is pivotally and lockably mounted on leg 30 at 48; and another clamp 49, having the same function, is pivotally and lockably mounted on leg 31 at 50. Both clamps are secured to frame 29 by means of screws.

Two sheets 51 and 52 of rigid material are shown mounted on the gage in Fig. 3. Sheet 51, represented by solid lines, is in engagement with detents 39, 41, and 42, and, being relatively small, does not extend from leg 30 to the position of detent 43. Sheet 52, represented by dotted lines, is in engagement with detents 39, 41, and 43, being larger than sheet 51. The two sheets are, of course, not presumed to be present at the same time; however, since both are indicated in a single figure, detent 42 is shown rotated about 90° with respect to detents 41 and 43, whereby a considerable difference of orientation of the two sheets is apparent.

It will be readily understood that the presently described embodiment which is obviously intended for use with sheets varying considerably in size, may well have more than three horizontally spaced detents. Only two of the detents mounted on the horizontal leg of the frame need be used for predetermining the orientation of a sheet or sheets mounted on the gage. While it is possible to adjust the several detents mounted on the horizontal leg of the frame so that an edge of a sheet may engage all such detents, it is plainly unnecessary, as the engagement of one of two adjacent edges of a sheet with the detent mounted on the vertical leg of the frame and of the other of the two adjacent edges with only two detents mounted on the horizontal leg insures accuracy as great as may be obtained.

When a relatively small sheet, such as 51, is involved, detent 43 and its adjustment may be disregarded. When a relatively large sheet, such as 52, is involved, detent 42 should be adjusted so that its high point is well below the high points of detents 41 and 43 to prevent any interference by detent 42 with the orientation of a sheet mounted on the gage.

A third embodiment of the invention is illustrated in Figs. 5 and 6. In this embodiment the frame, designated 53 in its entirety, is a rigid rectangular element having a central rectangular fenestration 53a. As in the last-described embodiment, there are four detents, all represented as being adjustable and lockable; and these detents are also coaxially counterbored right cylinders. Each detent is provided with an eccentric screw hole which is not tapped. One detent 54, is mounted on the left side of the frame and secured thereto by a screw 55 which is driven into the frame. This detent, as well as each of the others in this embodiment, is provided with a flange 55a. The other three detents, 56, 57, and 58, are mounted on the lower portion of the frame, and are respectively secured to the frame by screws 59, 60, and 61. See Fig. 6. The flanges 55a of the several detents are employed as mounts for a sheet placed on the gage (see Fig. 5). The axes of the mounting screws 59, 60, and 61 lie in a common plane.

A clamp 62, having a toe 62a (indicated by dotted line in Fig. 5) of resilient material for holding a sheet flatwise against the flanges 55a of the several detents, is pivotally and lockably mounted on the side of the frame 53 at 63. Another clamp 64, having a similar toe 64a (indicated by a dotted line in Fig. 5), is pivotally and lockably mounted on the lower portion of the frame 53 at 65. Both clamps are secured to the frame by means of screws.

Two sheets 66 and 67 of rigid material are shown mounted together on the gage in Figs. 5 and 6.

A fourth embodiment of the gage is shown in Figs. 7 and 8, both of which are diagrammatic, this embodiment being in combination with means for supporting and orienting the same. In Fig. 7 the gage is seen to be mounted on a supporting structure adapted to shift the gage within its own plane horizontally and vertically, or along either of two axes disposed at 90° to each other. In Fig. 8 the gage is seen to be mounted on a supporting structure adapted to rock the gage within limits and within its own plane.

This embodiment of the gage is provided with a rigid L-shaped frame 110, similar to the frame 29 of the embodiment illustrated in Fig. 3. The vertical leg of the frame is designated 111, and the horizontal leg 112. In Fig. 8 the leg 112 is mounted for sliding horizontal movement within a keyway 113, similar to keyway 32, provided in a horizontal bar 114, similar to bar 33. The structure involving the horizontal leg 112 and the bar 114 may be assumed to be similar to that involving leg 31 and bar 33 (see above). Thus the frame 110 may be shifted back and forth on bar 114 and locked at particular stations, as previously described. In Fig. 8 details of this structure are omitted, and the keyway 113 is indicated by a dotted line. In Fig. 7 the bar 114 is omitted.

Leg 111 is provided with a detent 115, and a clamp 116. Leg 112 is provided with two detents 17 and 118, and a clamp 119. Detents 115, 117, and 118 are alike, and any one of them is like any one of the detents shown in Fig. 3 and may be mounted similarly on frame 110. Clamps 116 and 119 may be secured to this frame in any suitable manner.

With the exception of a fourth detent, as shown in Fig. 3, the present embodiment and its function are substantially like the embodiment of that figure and its function. However, the purpose of Figs. 7 and 8 is to show an L-shaped gage according to the present invention mounted on different supporting structures adapted for selectively orienting the gage within its own frame respectively by shifting it left and right and up and down, as one example, and for rocking it, within its own plane.

Sheets 120 and 121 are shown mounted on the gage in Figs. 7 and 8 respectively.

The supporting structure shown in Fig. 7 comprises a main frame 122 having a panel mounted therein for vertical sliding movement. This panel is fenestrated at 124 (the fenestration appearing as a dotted rectangle in the figure), and is provided with horizontal guide rails 125 and 126, respectively above and beneath the fenestration. Mounted on these rails for horizontal sliding movement is another panel 127, and this panel carries the gage, as seen.

A motor 128 on main frame 122 is provided for driving, through bevel gears, a vertical screw 129 which is journaled in the main frame and threaded through a bracket 130 secured to the back of panel 123 near the top edge thereof. Rotation of screw 129 accordingly effects vertical sliding movement of panel 123, panel 127, and the gage. Another motor 130a, mounted on the back of panel 123, is provided for driving, through bevel gears, another screw 131, which is horizontal, and which is journaled in a bracket 132 secured to the back of the panel and is threaded through another bracket 133 secured to the back of panel 127. Bracket 133, of course, extends through the fenestration of panel 123. Rotation of screw 131 accordingly effects horizontal sliding movement of panel 127 and the gage.

The supporting structure for the gage shown in Fig. 8 comprises a main frame 134 having a panel 135 mounted thereon for limited rotary movement within its own plane, and this panel carries the gage, as seen. Both the main frame 134 and the panel 135 are square. Near each of the corners of the panel 135 and on the rear thereof is secured a rigid stub shaft 136; and rotatably mounted on the stub shaft is a wheel 137. Preferably the wheels 137 are provided with peripheral grooves, which may be V-shaped in cross section. The main frame 134 is provided with a centrally disposed square fenestration 138. Mounted on the main frame near each corner thereof is a plate 139. Each plate is three-edged, with one edge 140 being arcuate and concave. The edges 140 of the plates 139 define parts of a circle the center of which is the center of the supporting structure. The edges 140 provide an interrupted circular track for the wheels 137, as indicated in the drawing. If the wheels 137 are provided with peripheral grooves which are V-shaped in cross section, the edges 140 of plates 139 may be provided with opposing bevels to engage the peripheral grooves of the wheels; and it will be readily understood that panel 135 cannot then be normally separated from the main frame 134.

A bar 141 extends across the fenestration 138. Mounted on this bar behind panel 135 is a motor 142 having a gear 143 which meshes with another gear 144 secured to the center of the rear surface of panel 135. Accordingly motor 142 is adapted to rotate, within limits, panel 135 and the gage.

I claim:

A gage for registering transparencies, photographic plates, and the like, which comprises a frame having two adjacent side portions meeting at an angle; a cylinder mounted on one of said side portions for eccentric rotation with the axis of revolution of said cylinder normal to the plane of said frame, said cylinder having a flange adjacent said side portion; and a plurality of other cylinders mounted on the other of said side portions for eccentric rotation with the axes of revolution of said other cylinders normal to the plane of said frame, each of said other cylinders having a flange adjacent said other of said side portions, whereby a sheet of material, such as a transparency, may be supported by said gage with edges of said sheet in contact with the cylindrical surfaces of at least three of said cylinders and with a flat surface of said sheet in contact with the flanges of at least three of said cylinders.

References Cited in the file of this patent

UNITED STATES PATENTS

| | | |
|---|---|---|
| 635,061 | Sabel | Oct. 17, 1899 |
| 1,291,897 | Huebner | Jan. 21, 1919 |
| 1,908,253 | Johnson | May 9, 1933 |
| 1,912,547 | Smith et al. | June 6, 1933 |
| 2,290,585 | Gentry | July 21, 1942 |
| 2,372,493 | Heyman | Mar. 27, 1945 |
| 2,631,377 | Steczynski | Mar. 17, 1953 |
| 2,701,195 | Fleischmann | Feb. 1, 1955 |